3,292,856
SHAFTLESS UNBALANCED THERMOSTATIC VALVE
Paul K. Beatenbough, Medina, and Edward F. Lewis, Newfane, N.Y., assignors to General Motors Corporation, Detroit, Mich., a corporation of Delaware
Filed Nov. 16, 1964, Ser. No. 411,193
5 Claims. (Cl. 236—34)

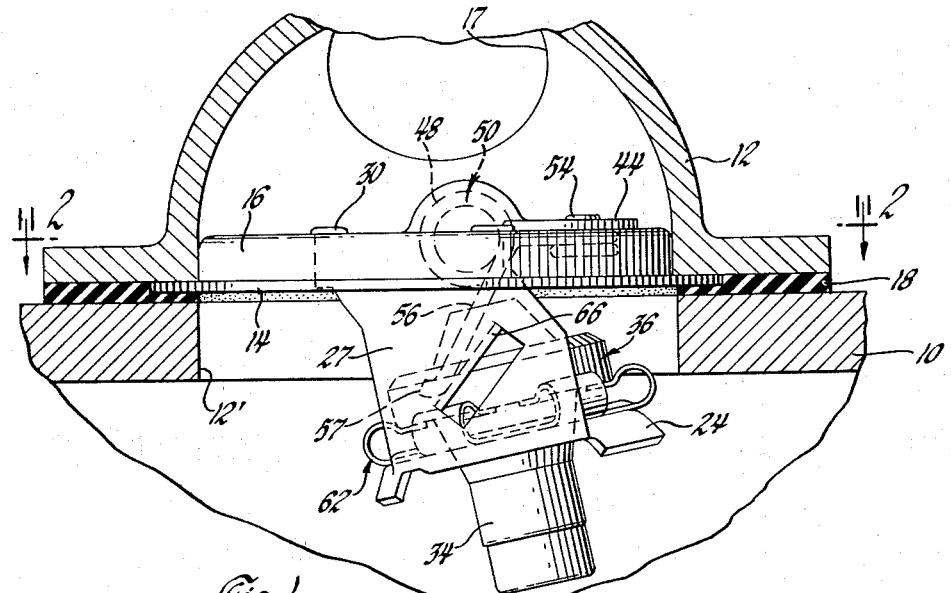
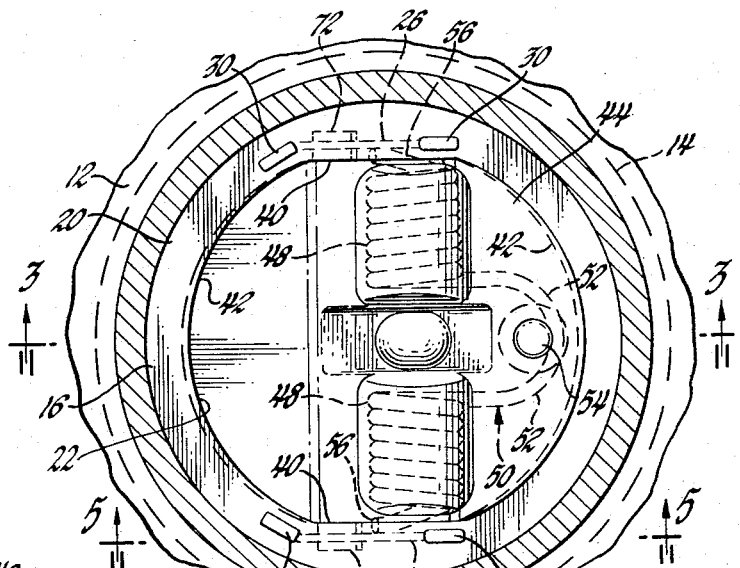

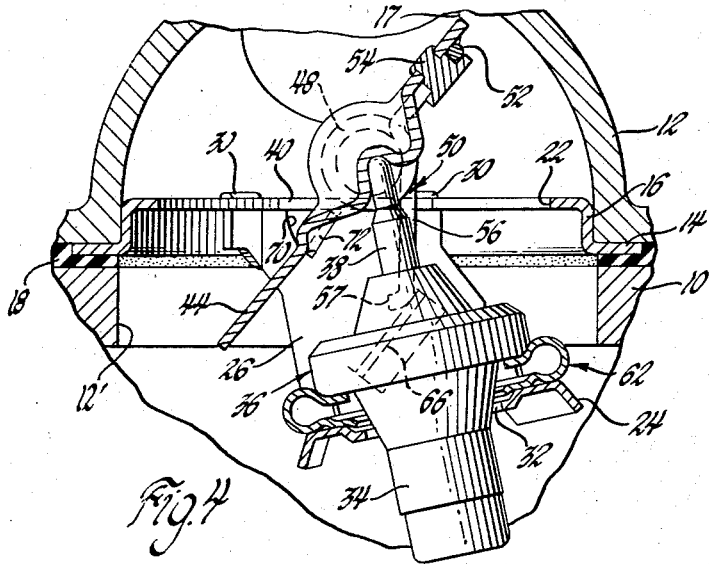
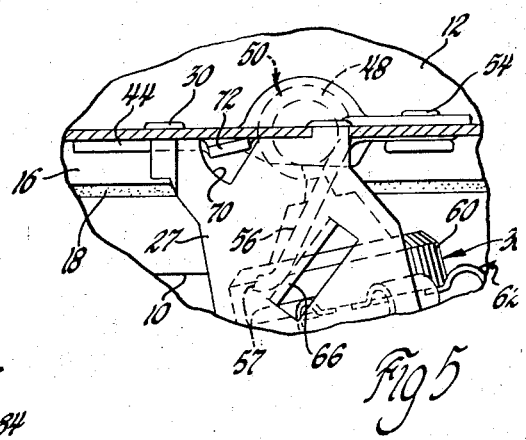
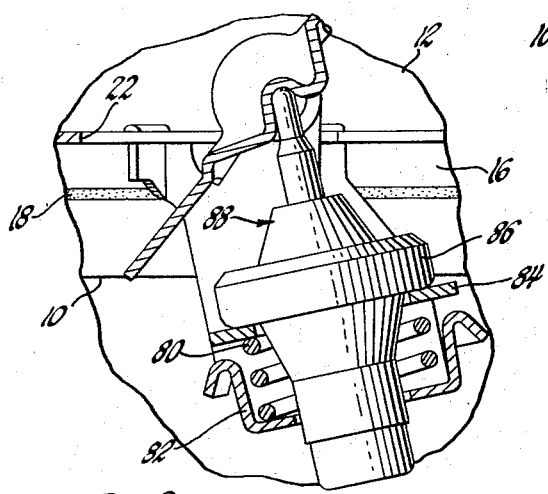
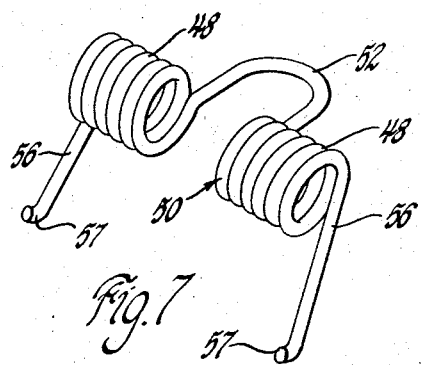
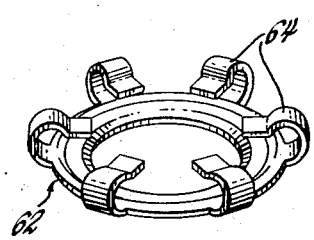
INVENTORS
Paul K. Beatenbough
& Edward F. Lewis
BY
George E. Johnson
ATTORNEY United States Patent Office 3,292,856
Patented Dec. 20, 1966

This invention relates to thermostats and more particularly to thermostatic butterfly valves adapted for use in liquid cooling systems of internal combustion engines.

Engine coolant thermostatic valves of the butterfly type have heretofore been balanced—i.e. each valve has been such that one portion of the valve which tends to be forced open by engine coolant pump pressure is equal in area to that portion of the valve which tends to be forced closed by the pump pressure. The balancing has been deliberate in order to make the valve operable thermostatically without disturbance because of variations in pump pressure. Such a balanced valve is disclosed in the United States Patent No. 2,815,916, granted December 10, 1957 in the names of J. R. Holmes, H. A. Reynolds and A. Schwarz. It has now been found, however, that balanced thermostatic valves of the butterfly type have a tendency to permit the engine or coolant temperature to increase with an increase in engine speed whereas it is often desirable to hold the coolant temperature constant or, perhaps, reduce it as the engine speed increases.

Despite the success in the maintenance of a desired engine coolant temperature at normal or high engine speeds by a properly designed balanced thermostatic butterfly valve, it has also been noted that a low engine speed is often accompanied by too low engine temperature and car heater output temperature as the operation of a balanced valve has heretofore not compensated for the fall-off in the coolant pump output and low coolant flow at such speed.

It has also been noted that in butterfly type thermostat valves as heretofore developed reliance is placed upon a definite pivot point for the valve and, therefore, there arises the necessity for attendant close tolerances conducive to sticking of that valve due to the presence of dirt particles in the coolant. Sticking of a thermostat valve, particularly while in the closed position, cannot be condoned.

One object of the present invention is to provide an improved thermostatic valve which permits compensation for a variation in fluid pressure in acquiring a controlled temperature of that fluid. Another object of the invention is to provide an improved thermostatic valve which is capable of compensating for a low coolant flow rate in acquiring a desired coolant temperature to be maintained substantially constant or along a desired gradient by the throttling action of the valve despite variations in the flow rate.

A feature of the present invention is an unbalanced, shaftless, butterfly type thermostatic valve having a frame and a plate valve terminating at facing surfaces at opposite sides of a flow passage in the frame and controlled by the valve. Another feature is a butterfly type thermostatic valve in which spring means is utilized in series with a pellet motor to aid in maintaining a flow passage closed when the valve is subjected to low fluid temperature and/or pressure. Another feature is an unbalanced butterfly type thermostatic valve in which a torsion spring is fixed to the valve for bodily movement therewith on a frame, and the frame having a surface on which one end of the spring may slide during opening and closing of a flow passage controlled by the valve and defined by the frame. Another feature is a butterfly type thermostatic valve in which a multiple coil spring may bodily oscillate with a plate valve as the latter opens and closes with relation to an opening in a frame, surfaces being provided on the frame for slidably engaging the ends of the spring.

These and other important features of the invention will now be described in detail in the specification and then pointed out more particularly in the appended claims.

In the drawings:

FIGURE 1 is a sectional view of conduit elements between which is inserted a thermostatic valve for controlling the flow of engine coolant through the elements, the valve being closed and constituting one embodiment of the present invention;

FIGURE 2 is a sectional view looking in the direction of the arrows 2—2 in FIGURE 1;

FIGURE 3 is a sectional view taken along the line 3—3 of FIGURE 2 and showing a section of the valve as well as portions of the conduit elements;

FIGURE 4 is a sectional view like that of FIGURE 3 but showing the valve fully open;

FIGURE 5 is a sectional view looking in the direction of the arrows 5—5 in FIGURE 2;

FIGURE 6 is a sectional view similar to that of FIGURE 4 but showing a modified construction;

FIGURE 7 is a perspective view of released main spring means utilized in the assembly of the valve of FIGURES 1 to 6 inclusive; and FIGURE 8 is a perspective view of secondary spring means employed in the valve of FIGURES 1 to 5 inclusive.

In FIGURE 1, conduit elements such as 10 and 12 are disclosed and between which is interposed a supporting flange 14 of a frame 16. The conduit element 10 represents a portion or wall of an engine block with an outlet orifice 12' for receiving engine coolant as directed by a conventional liquid coolant pump. The conduit element 12 is shown in the form of a casing having an outlet 17 adapted to direct engine coolant to the top of an automobile radiator. A sealing gasket 18 is interposed with the flange 14 to form a tight joint between the conduit elements 10 and 12.

The frame 16 is of sheet metal and in addition to the peripheral or supporting flange 14, it includes an annular flat flange 20 defining a flow passage 22 and presenting seat surfaces for a plate valve to be described.

A U-shaped member 24 is provided with legs 26 and 27 each of which is fixed to the flat flange 20 by means of upset tabs 30. An intermediate portion of the U-shaped member 24 is apertured as at 32 for freely receiving the casing portion 34 of a pellet motor generally indicated at 36. This pellet motor may take any of various forms which are now on the market and the depicted in the drawings includes a plunger 38 which is forced out from the casing 34 when a wax composition in the latter is subjected to an elevated temperature and expands. Spring means to be described hereinafter are utilized to retract the plunger 38 into the casing 34 when the temperature drops and the wax contracts.

The flow passage 22 of the frame 16 has two facing edges 40 (FIGURE 2) which are straight. These straight edges are joined by arcuate edges 42 in defining the flow passage 22 and a plate valve 44 is so made as to extend through the flow passage 22 with one dimension terminating at the opposed straight edges 40 and in one direction and the dimensions of the plate valve as measured in a direction normal to that one direction being in excess of that of the corresponding dimensions of the flow passage 22 so an overlap at each arcuate edge 42 results as clearly shown in FIGURES 2 and 3.

The plate valve 44 has two recesses 46 formed therein for retaining two groups of coils 48 of a main spring means 50. This spring means has a loop 52 joining the two groups of coils and this loop is fixed by a rivet 54 to the plate valve. One end of each group of coils 48 is in the form of an extended or straight leg 56 having an upturned end 57.

Interposed between an annular shoulder portion 60 of the motor 36 and the intermediate portion of the U-shaped member 24 is a secondary spring means 62 in the form of an annulus. This spring means is provided with six radially extending and reversely bent spring clips 64 (FIGURE 8) for engaging the shoulder portion 60 of the motor.

Each leg 26 or 27 of the U-shaped member is cut to form an inwardly bent flange 66 and these flanges are such as to present a surface inclined to the axis of the pellet motor 36. The upturned ends 57 of the spring 50 act against the surfaces of the inclined flanges 66 with sufficient loading of the spring 50 to urge the plate valve 24 in closed or seating relation with the frame 16 despite the resisting spring force of the secondary or annular spring 62 which tends to open the plate valve.

Each leg 26 or 27 is formed with a substantially V-shaped stop opening 70 and aligned trunnion portions 72 are fixed to one side of the plate valve 44 and are received within the stop openings 70 beneath the straight edges 40 thereby to limit the possible sliding movement of the plate valve on and with respect to the frame 16.

It will be noted that trunnion portions 72 are so placed as to make the plate valve unbalanced—i.e. pump pressure beneath the plate valve 44 will cause a tendency for the valve to open against resistance of the torsion spring 50. The degree of unbalance required in a given installation will vary depending upon the desired control characteristics and upon the relation between engine speed, pump pressure and engine heat rejection to the coolant for the engine under consideration. In practical cases the degree of unbalance may range between 5% and 25%. If desired, the same principle of unbalance may be used in reverse—i.e. to obtain a butterfly thermostat which increases the control temperature with engine speed but in the construtcion shown, an increase in engine speed will increase the pump pressure and that in turn, because of the unbalance, will cause an increase opening of the plate valve and thereby reduce the otherwise existent coolant temperature.

It is preferred because of the range of valve opening desired that the torsion spring be permitted bodily to move with the plate valve as the latter rotates and also to permit the upturned or free ends 57 of the torsion spring 50 to slide on the frame. If these expedients were not used, the torsion spring could perform its work through a narrow range but a wider range is generally required in which case the expedients referred to prevent overstressing of the spring material.

Car heaters depend for their heat output upon the engine coolant temperature and at low engine speeds and although past thermostat valve designs succeeded in maintaining a somewhat constant minimum coolant temperature, the heater discharge temperature has been lower at low engine speeds than at high engine speeds due to fall-off in water pump output and hence of heater water flow. To compensate for this, the spring 62 acts in series with the motor 36 in such a way that the spring 62 yields or becomes compressed before the motor 36 becomes effective to open the plate valve 44. The delay in opening of the valve serves to elevate the coolant and heater output temperature.

In the modified structure of FIGURE 6, a coil spring 80 is used in place of the annular spring 62 and this spring is caused to act between the modified U-shaped member 82 and a washer 84 bearing against the shoulder portion 86 of a pellet motor generally indicated at 88. This spring 80 operates much like the annular spring 62 but is not as compact. As either the spring 62 or the spring 80 acts in series with the motor 36, it is clear that the spring action may be interposed between the motor housing and the frame as illustrated in the drawings or could be placed between the plunger 38 and the plate valve 44. Also, if desired, the U-shaped member 24 could be designed to act as a spring. In any event, the spring 50 or 80 has a limited range of action critical in the start to open stage of the plate valve 44. As the coolant temperature increases above that stage, the supplemental spring 62 or 80 has no effect on the action of the pellet motor in positioning the plate valve but acts as a positive stop for the motor housing.

We claim:

1. A shaftless valve structure including a supporting frame defining a flow passage, a butterfly plate valve extending through said passage and mounted on said frame to rotate on an axis traversing said passage to control the latter, said plate valve extending further on one side of said axis than on the other to create an unbalance, means comprising a thermostatic motor and a coil torsion spring interposed between a portion of said frame and said plate valve for actuating the latter, and said coil spring being fixed to said plate valve so that the axis of said spring is adapted to move with said plate valve with respect to said frame.

2. A shaftless valve structure as set forth in claim 1, said butterfly plate valve defining a recess, and said torsion spring having at least one coil retained in said recess, and said torsion spring having one end slidable on said frame.

3. A shaftless valve structure as set forth in claim 1, said butterfly plate valve defining a recess, said torsion spring having coils retained in said recess, said frame having a surface inclined to the axis of said thermostatic motor, and one end of said torsion spring slidable on and bearing against said surface thereby urging said plate valve toward its closed position.

4. A shaftless valve structure comprising a supporting frame with a flat flange defining a flow passage and a U-shaped member spanning said flow passage, a plate valve extending through said flow passage with a maximum dimension in one direction lying within said flow passage as a close fit, the dimensions of said plate valve as measured normal to said one direction slightly exceeding the corresponding dimensions of said flow passage to create an overlap when said plate valve is in its closed position, the legs of said U-shaped member bearing slide surfaces and defining stop openings, aligned trunnion portions fixed to one side of said plate valve and extending into said stop openings to limit motion of said plate valve with respect to said frame, a thermostatic pellet motor interposed between an intermediate portion of said U-shaped member and said plate valve to actuate the latter, a recess in said plate valve, a torsion spring fixed to the latter bodily to rotate therewith, said torsion spring having coils resting in said recess and ends acting against and slidable upon said slide surfaces urging said plate valve toward its closed position, secondary spring means of lesser loading than that of said torsion spring interposed between said motor and said U-shaped member urging said plate valve to open.

5. A shaftless valve structure as set forth in claim 4, said secondary spring means being in the form of an annulus, said torsion spring having two groups of coils, the axis of said torsion spring extending in said one direction, and a loop of said torsion spring joining said groups being fixed to said plate valve.

References Cited by the Examiner

UNITED STATES PATENTS

| | | | |
|---|---|---|---|
| 2,060,301 | 11/1936 | Golob | 236—34 |
| 2,255,543 | 9/1941 | Fisher | 236—34 |
| 2,278,421 | 4/1942 | Brown | 236—34 |
| 2,293,913 | 8/1942 | Munson | 236—34 |
| 2,569,359 | 9/1951 | Vellinga | 236—34 |
| 2,815,173 | 12/1957 | Drapeau et al. | 236—34 |
| 2,954,930 | 10/1960 | Linder | 236—34.5 |

EDWARD J. MICHAEL, *Primary Examiner.*